3,605,491
CABLE CLAMP PARTICULARLY FOR CABLE CARS
Eduard Senn, Hungerburg 46, Innsbruck, Austria
Filed July 29, 1968, Ser. No. 748,434
Int. Cl. G01l *1/04;* B61b
U.S. Cl. 73—141A 7 Claims

ABSTRACT OF THE DISCLOSURE

A cable clamp, particularly for cable cars, comprising two clamping parts displaceable relative to each other. The clamping faces of the clamping parts being at least partly inclined to the axis of the cable and imparting to the cable a slight double S-curvature between the clamping parts, and a spring in the path of the clamping force between the two clamping parts. Means for measuring the extent of the deformation of the spring and means for measuring the extent of the relative displacement of the clamping parts are also provided.

---

Figure 1:
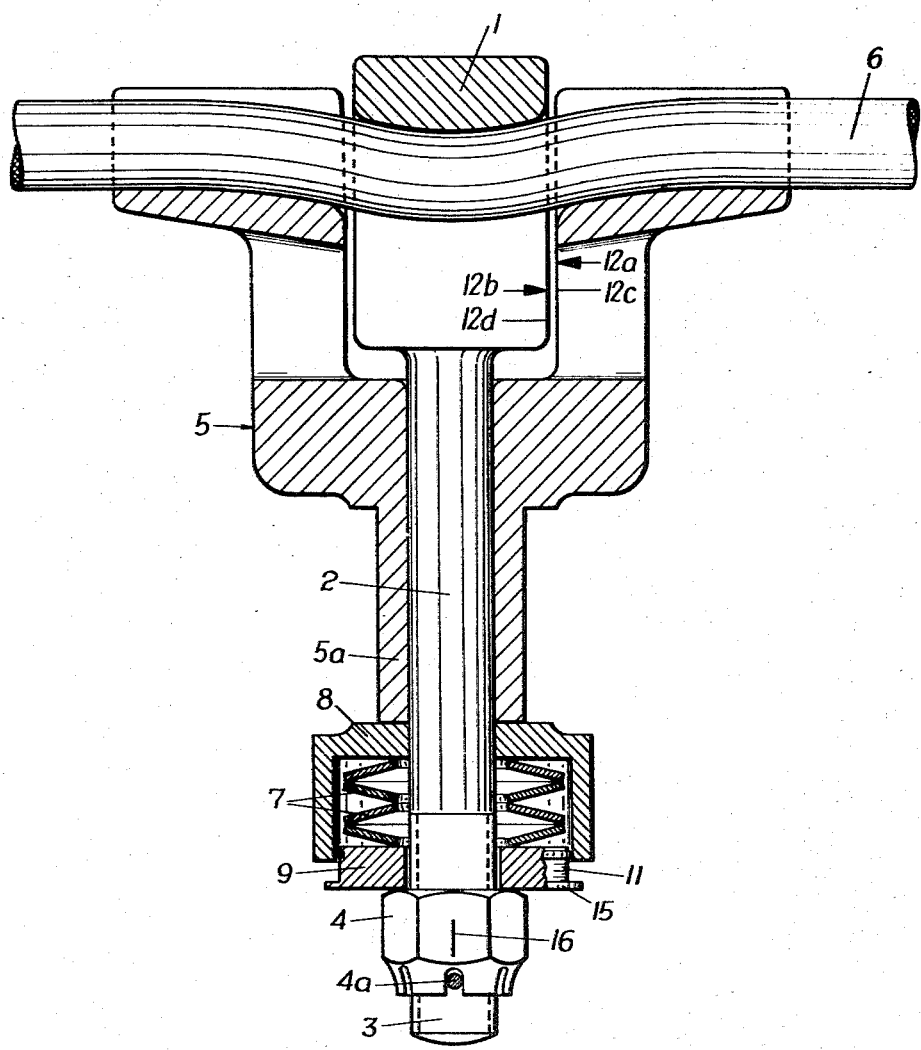

The present invention relates to cable clamps, in general, and to such clamps used for cable cars, in which the cable is clamped between two parts mounted displaceably relative to each other, in particular. Several structures are known for effecting a clamping effect. In a first type of structure, the cable is clamped between two parts mounted displaceably relative to each other, similar to the jaws of a vise.

In accordance with another type of structure, this vise-like operating clamp is equipped with springs. In a third type of structure, the cable is bent out in the clamp, whereby not only the pressing of the cable, but also the cable stiffness are utilized for the clamping effect.

The torque exerted on the securing nut depends upon the friction forces between the nut and the threaded bolt, on the one hand, and between the nut and the washer disc or the base, respectively, on the other hand. Experiments have shown that the torque and the friction load which is caused thereby can vary considerably. The friction load is to be understood as the force which must be applied to the clamp in the direction of the cable axis in order to cause the clamp to slide on the cable.

Numerous experiments have further disclosed that the friction load R is approximately proportional to a force P, in the case of a clamp causing a bending of the cable, by which the two clamped parts mounted displaceably relative to each other are pressed towards each other. Thus, $R/P \approx K$, $K \approx 0.48$ where R is the friction load, P the force and K the constant of proportionality.

Experiments have ascertained that this simple relation is valid independently of the prevailing bending of the cable in the clamp. This relationship is also true if, with the same clamp, cables are used with different cable diameters, up to about 5% relative to a nominal diameter. If one wishes to cause the clamp to assume a predetermined friction load R, it is merely necessary to apply a force P, such that $P = R/K$. By the present invention there is provided a cable clamp, particularly for cable cars, in which the cable is clamped between two clamp parts displaceable relative to each other, crosswise to the longitudinal direction of the cable, the supporting faces of the clamping parts being at least partly inclined to the axis of the cable and imparting to the cable a slight double S-curvature between the clamping parts.

Accordingly, there is provided an arrangement by which, at all times during the use of the clamp, it can be determined whether the clamping force falls below the permissible value.

In accordance with the present invention, a spring is operatively connected to the two clamping parts. The extent of deformation of the spring as well as the extent of the relative displacement of the clamping parts can be readily measured.

It is possible, under certain circumstances, that the spring is deformed an amount corresponding to the required clamping force, but the clamping parts are not sufficiently displaced relative to each other that, by corresponding bending of the cable, the required clamping effect also is achieved. To avoid this possibility, there is provided a means for reading the relative displacement of the clamping parts. When the means for reading relative displacement indicates that the clamping parts have been sufficiently displaced relative to each other, the clamping effect actually corresponds to the applied clamping force indicated by the spring deformation, and is thus greater than the friction load which occurs.

In accordance with a preferred embodiment of the present invention, a cable clamp having two clamping parts is used. One clamping part has a threaded bolt secured thereto and the other clamping part carries a sleeve in which the bolt is guided longitudinally. The sleeve carries a housing which contains a spring. A nut is threaded on said bolt and a disc, closing the housing, is interposed between the nut and spring.

Figure 2:
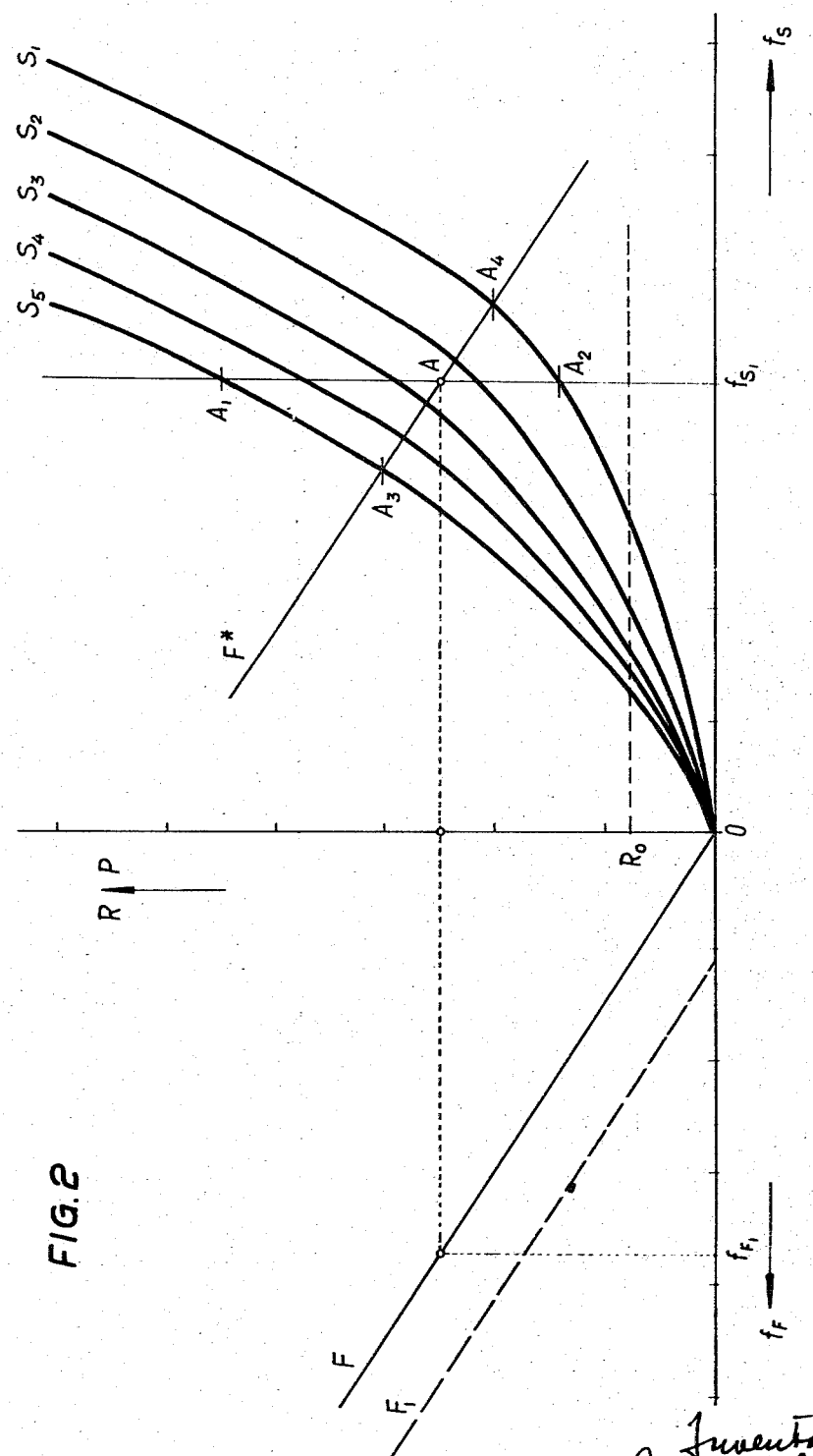

With these and other objects in view which will become apparent in the following detailed description, the present invention will be clearly understood in connection with the accompanying drawings, in which:

FIG. 1 is an axial section of a cable clamp designed in accordance with the present invention; and FIG. 2 is a graph depicting spring deformation v. clamping force and friction load, as well as cable bend v. clamping force and friction load.

Referring now to the drawings, and in particular to FIG. 1, the cable clamp, designed in accordance with the present invention, comprises a hook-shaped clamping part 1, from which a bolt 2 projects crosswise to the longitudinal direction of the cable. On the end of the bolt 2, which end is remote from the cable, a screw thread 3 is provided on which a nut 4 is mounted. A second fork-shaped clamping part 5 is provided and comprises a sleeve portion 5a in the bore of which the bolt 2 is guided longitudinally.

When by tightening of the nut 4 the clamping part 1 presses the cable against the clamping part 5, the cable 6 forms between the supporting points on the clamping parts 1 and 5 a slight double-S-shaped curvature.

The spring 7 comprises a plurality of spring blades. The spring is disposed between the bottom of a spring housing 8 and a disc 9 disposed in the housing. The disc has a bore through which the bolt 2 extends. After tightening of the nut 4, the latter can be secured in its position by means of a cotter pin 4a. It is suitable to provide a seal between the disc 9 and the spring housing in order to prevent the penetration of water into the spring housing 8.

In order to be able to read the deformation of the spring 7 and the clamping force P corresponding thereto, a rule 11 is provided on the peripheral face of the disc 9. The value of the deformation could be measured by simple means, for instance, by means of a Vernier caliper. In order to be able to read the amount of the bending of the cable in the clamp, rules 12b and 12a are provided at the clamping parts 1 and 5, respectively. As a minimum markers are provided on the parts 1 and 5, respectively. The zero position of the rules 12a and 12b can be obtained by setting, in place of the cable, a cylindrical body with the nominal diameter of the cable into the clamp and by displacing the two clamping parts 1 and 5 relative to each other until snug fitting contact with the cylindrical body is achieved.

Referring again to the drawings, and in particular to FIG. 2, in the left quadrant the characteristic line F of the spring 7 is shown. It extends from the coordinate center point O inclined upwardly towards the left and indicates the relation between the spring deformation $f_F$ and the clamping force P. In the right quadrant, the characteristic lines of the cable bend in the clamp are shown for different cable tensions $S_1$ to $S_5$, whereby $S_1$ constitutes the smallest and $S_5$ the largest cable tension which occurs. On the right abscissa the bending $f_S$ of the cable is depicted.

If no spring 7 were present in the clamp, for different cable tensions $S_1$ to $S_5$ and equal bending $f_{S1}$ of the cable, P would vary between the values $A_1$ and $A_2$. If, however, a spring with the characteristic line F is provided, clamping force P varies between the values $A_3$ and $A_4$ along the straight line F* (parallel to the characteristic line F and intersecting the point A representing a median cable pressure). For different cable tensions $S_1$ to $S_5$, clamping force P varies only between the values $A_3$ and $A_4$.

In case one wishes to reduce the deformation of the spring, the spring 7 can be pre-tensioned. Such at spring characteristic line $F_1$ is depicted in FIG. 2. Furthermore, to insure that the spring 7 is not compressed to a great extent, the disc 9 is provided with a projecting edge 15, which abuts the lower edge of the spring housing 8 during the largest permissible deformation of the spring 7.

The total deformation of the spring 7 and the displacement of the clamping parts could also be measured by displacing the two clamping parts 1 and 5 relative to each other until they merely engage the cable. Thereafter, the number of revolutions of the nut 4 is counted and multiplied by the pitch of the threads. For instance, in case of a pitch of 3.5 mm., two revolutions result in a total spring deformation of 7 mm.

Practically, for instance, a marker 16 may be provided on the nut 7 and one can observe how much it is turned.

I claim:

1. A cable clamp, particularly for cable cars, comprising
    two clamping parts displaceable relative to each other, the clamping faces of said clamping parts being at least partly inclined to the axis of the cable and imparting to the cable a slight double S-curvature between said clamping parts,
    a spring disposed in the path of the clamping force between said two clamping parts,
    first means for measuring the extent of the deformation of said spring, and
    second means for measuring the extent of the relative displacement of said clamping parts.

2. The cable clamp, as set forth in claim 1, which includes
    a threaded bolt having a nut at one end, said bolt projecting crosswise from said cable and secured to one of said clamping parts,
    a sleeve carried by the other of said clamping parts for receiving and guiding axially said bolt,
    a housing member secured to said sleeve for receiving said bolt and said spring, and
    a disc closing said housing member with the inner side thereof resting on said spring, and the outer side thereof engaged by said nut.

3. The cable clamp, as set forth in claim 2, wherein
    said disc and said housing constitute two relatively movable elements,
    one of said elements has on its periphery a rule to indicate the position of said one of said elements in relation to said other of said elements in order to read on said rule the extent of deformation of said spring.

4. The cable clamp, as set forth in claim 1, wherein said spring is pretensioned.

5. The cable clamp, as set forth in claim 1, which includes
    means for limiting the path of compression of said spring.

6. The cable clamp, as set forth in claim 5, wherein said limiting means comprises an abutment means secured to said disc and abutting said pot.

7. The cable clamp, as set forth in claim 1, wherein
    said clamping parts comprise a hook-shaped clamping part and a fork-shaped clamping part,
    said fork-shaped clamping part having two cable clamping faces and said hook-shaped clamping part have one cable clamping face, said two clamping faces being spaced apart along said cable at one side thereof and said one clamping face being positioned along the opposite side of said cable between said two clamping faces.

References Cited
UNITED STATES PATENTS

| 1,322,123 | 11/1919 | Larson | 73—144 |
| 3,037,464 | 6/1962 | Penney et al. | 104—209 |
| 3,420,189 | 1/1969 | Wallmannsberger | 104—202 |

FOREIGN PATENTS

| 431,626 | 9/1911 | France | 73—144 |
| 801,604 | 5/1936 | France | 73—144 |
| 907,137 | 6/1945 | France | 73—144 |
| 1,376,056 | 9/1964 | France | 104—202 |

CHARLES A. RUEHL, Primary Examiner

U.S. Cl. X.R.

104—209